United States Patent [19]

Morishita et al.

[11] 4,118,336

[45] Oct. 3, 1978

[54] NOVEL CELLULOSE MICROCAPSULES AND PREPARATION THEREOF

[75] Inventors: Masataka Morishita, Shizuoka; Yasuo Yokokawa, Tokyo; Tokio Nishikawa, Hikone; Masahiro Mishiro; Shigeyasu Ohashi, both of Moriyama; Mitsuru Fukushima, Shizuoka; Yoshihito Inaba, Shizuoka; Tetsuo Matsuda, Shizuoka, all of Japan

[73] Assignees: Toyo Jozo Company, Ltd.; Asahi Kasei Kogyo Kabushiki Kaisha, both of Japan

[21] Appl. No.: 750,588

[22] Filed: Dec. 15, 1976

Related U.S. Application Data

[63] Continuation-in-part of Ser. No. 560,937, Mar. 21, 1975, abandoned.

[30] Foreign Application Priority Data

Mar. 25, 1974 [JP] Japan .................................. 49-32686

[51] Int. Cl.$^2$ ............................................. B01J 13/02
[52] U.S. Cl. ..................................... 252/316; 424/22; 424/35
[58] Field of Search ................... 252/316; 424/35, 22; 536/76

[56] References Cited

U.S. PATENT DOCUMENTS

| 2,629,713 | 2/1953 | Goebel | 526/10 |
| 3,522,346 | 7/1970 | Chang | 252/316 X |
| 3,558,507 | 1/1971 | Harbort | 424/35 X |
| 3,725,113 | 4/1973 | Chang | 424/35 |

FOREIGN PATENT DOCUMENTS

931,148 7/1963 United Kingdom .................... 252/316

*Primary Examiner*—Richard D. Lovering
*Attorney, Agent, or Firm*—Craig & Antonelli

[57] ABSTRACT

A novel cellulose microcapsule having adsorbing capacity, consisting of outer semipermeable barrier layer of cellulose and adsorbent powders dispersed within inner cellulose gel matrix, is prepared by ester hydrolysis of a precursor microcapsule consisting of cellulose ester derivative and adsorbent powders. It is excellent in resistance to chemicals such as acids, alkalis or organic solvents and is useful for various purposes.

20 Claims, No Drawings

NOVEL CELLULOSE MICROCAPSULES AND PREPARATION THEREOF

CROSS REFERENCE TO RELATED APPLICATION

This application is a continuation-in-part of application Ser. No. 560,937, filed Mar. 21, 1975, and now abandoned.

This invention relates to a novel cellulose microcapsule having adsorbing capacity, which consists of outer semipermeable barrier layer of cellulose and adsorbent powders dispersed within inner cellulose gel matrix, and to a process for producing the same.

Particles which contain adsorbent powders encapsulated within semipermeable polymeric microcapsule wall films, have been produced by conventional microencapsulation techniques such as encapsulating by coagulation in liquid medium, by phase separation or by drying in liquid vehicle. Various polymeric materials have been used to form wall films of such microcapsules. For example, there have been used such cellulose derivatives as cellulose acetate, cellulose propionate, cellulose butyrate, cellulose acetate propionate, cellulose acetate butyrate, etc. Other polymers such as polyacrylonitrile, polyacrylic esters, acrylate-methacrylate copolymers, polyvinyl chloride, polyvinyl butyral, polyvinyl formal, vinyl chloride-vinyl acetate copolymer, etc. have also been used. However, these polymer materials known in the art proved to be not satisfactory in resistance to chemical reagents. Namely, they are disintegrated in acidic or alkaline aqueous solutions or they are dissolved by various organic solvents. For example, if the microcapsules which consist of cellulose acetate or polyacrylonitrile and adsorbent powders are charged in 1 N sodium hydroxide solution under heating, they are disintegrated to release adsorbent powders encapsulated therein. As these particles are frequently subjected to treatment with various chemicals such as acidic or alkaline aqueous solutions or organic solvents, occasionally under heating, at the time of regeneration or elution, they are required to be highly resistant to such chemical reagents.

An object of the present invention is to provide a novel adsorbent particle which is resistant to various chemical reagents.

The other object of the present invention is to provide a process for producing such novel adsorbent particle as mentioned above which can be practiced very easily.

According to the present invention, there is provided a cellulose microcapsule having adsorbing capacity consisting of outer semipermeable barrier layer of cellulose and adsorbent powders dispersed within inner cellulose gel matrix.

The present invention also provides a process for producing the cellulose microcapsule as mentioned above, which comprises subjecting a precursor microcapsule having adsorbing capacity, consisting of outer semipermeable barrier layer of cellulose ester derivative and adsorbent powders dispersed within inner gel matrix of cellulose ester derivative, to ester hydrolysis.

The cellulose microcapsules having adsorption capacity of the present invention can be produced by subjecting a specific class of precursor microcapsules to ester hydrolysis. The precursor microcapsules herein contemplated include all of the microcapsules having cellulose ester derivatives as wall films and containing adsorbent powders enclosed therein.

As the cellulose ester derivative, any cellulose ester derivative may be used so far as it can be used for wall films of the microcapsules. Examples of such cellulose ester derivative include fatty acid esters of cellulose such as cellulose monoacetate, cellulose diacetate, cellulose triacetate, cellulose propionate and cellulose butyrate, mixed fatty acid esters of cellulose such as cellulose acetate propionate and cellulose acetate butyrate, inorganic acid esters of cellulose such as cellulose nitrate, cellulose sulfate and cellulose phosphate, and aromatic acid esters of cellulose such as cellulose benzoate. As the adsorbent, any material may be used so far as it has an adsorption capacity that is not deactivated in adsorption capacity by ester hydrolysis. Examples of such adsorbent include powders of activated charcoal, bone black, silica gel, silica alumina gel, zeolite, bentonite, ion exchange resins and metal chelate resins.

The microcapsules having wall films composed of a cellulose ester derivative, containing adsorbents and having selective adsorbing ability, which are used in the present invention, are those having wall films composed of a cellulose ester derivative and containing an adsorbent as the core substance of each microcapsule, which are obtained by, for example, a coating method according to curing-in-liquid procedure, a coating method according to phase separation procedure, a drying-in-liquid method, etc.

Examples of the said methods are as follows:

A method is featured in that an adsorbent is dispersed in a solution of a cellulose ester derivative in a hydrophilic solvent, the resulting dispersion is further dispersed to the form of the droplets in a vehicle, which is poorly miscible with the solvent for the cellulose ester derivative, and then a solvent, which is a non-solvent for the cellulose ester derivative, is miscible with the solvent for said derivative, and is miscible or poorly miscible with the vehicle, is added to the dispersion, to obtain microcapsules having wall films composed of a cellulose ester derivative, containing adsorbents and having selective adsorbing ability. In the above-mentioned method, the cellulose ester derivative, which is a well material for the adsorbent, is properly selected and first dissolved in a hydrophilic solvent. As this solvent, any solvent may be used so far as it can dissolve the cellulose ester derivative and is poorly miscible, i.e. is entirely immiscible or is miscible in an amount of at most about 15%, with the vehicle mentioned later, and is not required to be limited to a solvent low in boiling point and high in vapor pressure. Examples of the said solvent include acetone, methanol, ethanol, isopropanol, dimethyl sulfoxide, N,N-dimethyl formamide, water, acidic water and basic water. The concentration of the cellulose derivative at the time of practice of the method varies depending on the derivative used and the combination thereof with the solvent, but may be optionally selected so far as the viscosity thereof is within such a range that the solution of said derivative is dispersible in the vehicle, and is ordinarily about 0.5 to 20 W/V%. Subsequently, an adsorbent is dispersed in the solution of said cellulose ester derivative to prepare a dispersion. When the cellulose ester is used in an amount of 0.05 to 5 parts per part of the adsorbent, not only the dispersing operation is facilitated but also the wall films of the resulting microcapsules become tough. The above-mentioned dispersion is further dispersed to the form of the fine droplets in a vehicle. As the vehicle, any liquid may be used so far as it does not dissolve the adsorbent nor the cellulose ester derivative, is poorly miscible with the solvent for the cellulose ester derivative, and can disperse the adsorbent-containing dispersion of cellulose ester derivative in the form of fine droplets. Examples of such liquid include liquid paraffins and silicone oils. Since these liquids vary in viscosity depending on the molecular weight and concentration thereof, there may be selected a liquid which can easily emulsify and disperse the cellulose ester derivative dispersion. The quantitative ratio of the adsorbent-containing cellulose ester derivative dispersion to the vehicle varies depending on the concentration of the cellulose ester derivative, but is generally 1 : 5–30 V/V. If the amount of the solvent against the cellulose derivative is excessively large, emulsified droplets of the cellulose derivative become too low in viscosity to keep their shape at the time of addition of the non-solvent, with the result that the adsorbent leaks out of the droplets. Further, when the non-solvent is added, desolvation takes place with difficulty unless the non-solvent is used in large quantities, and the solvent is left in the cellulose ester derivative in most cases. Since viscosity of the emulsified droplets thus vary depending on the cellulose ester derivatives, the solvent and the vehicle used and their proportion, it should be selected in accordance with the combination of the three. If the vehicle has previously been incorporated with about 0.1 to 2 V/V% of a surfactant, the cellulose ester derivative solution containing adsorbents can be easily emulsified and the emulsion is stable to give favorable results.

In the above-mentioned emulsification dispersion step, fine droplets of various sizes are obtained depending on an amount of the solvent, the stirring speed, the viscosity of the cellulose ester derivative, the viscosity of the vehicle and the surfactant used. Generally, the size of emulsified microcapsule droplets is smaller as the stirring speed is greater or the viscosity of vehicle for the cellulose derivative is lower. When the surfactant is used, the size of emulsified microcapsule droplets becomes smaller as the amount of the surfactant is greater. Subsequently, a non-solvent for the cellulose ester derivative is added to the above-mentioned cellulose ester derivative dispersion to deposit the cellulose ester derivative. Any of the non-solvents can be used so far as it does not dissolve the cellulose ester derivative, is miscible with the solvent therefor, and is miscible or poorly miscible with the vehicle. Examples of the non-solvent miscible with the vehicle include petroleum ether and n-hexane, while examples of the non-solvent poorly miscible with the vehicle include water, acidic water, basic water and aqueous formalin solution. As the non-solvent, if it is poorly miscible with the vehicle, is added to the dispersion of the cellulose ester derivative, the solvent for the cellulose ester derivatives is transferred due to contact with emulsified droplets of the non-solvent dispersed in the vehicle and, at the same time, deposition of the cellulose ester derivative takes place due to the non-solvent, whereby microcapsules are formed. When the non-solvent is miscible with the vehicle, it is brought into a state mixed with the vehicle, whereby the solvent is transferred in the same manner as above to deposit the cellulose ester derivative. The non-solvent may be gradually and directly added to the cellulose ester derivative dispersion, or, when the non-solvent is poorly miscible with the vehicle, it may be added in the form of a dispersion where the non-solvent has separately been dispersed in the vehicle. The thus formed microcapsules coated with the cellulose ester derivative containing absorbent and having selective adsorbing ability are separated according to a usual solid-liquid separation procedure, and then washed to obtain microcapsules to be saponified according to the present invention.

Another example is as follows:

Microcapsules having wall films composed of a cellulose ester derivative, containing adsorbents and having selective adsorbing ability is prepared by dispersing the adsorbents in a solution of a cellulose ester derivative in a hydrophilic solvent, said derivative being able to form a semipermeable film in an aqueous medium, and then contacting the resulting dispersion with an aqueous medium. In the above-mentioned method, the cellulose ester derivative capable of forming a semi-permeable film in an aqueous medium, which derivative is a wall material for the adsorbent, is properly selected and first dissolved in a hydrophilic solvent. As this hydrophilic solvent, any solvent may be used so far as it does not deteriorate the adsorption capacity of the adsorbent, is miscible with the aqueous medium, and can dissolve the cellulose ester derivative. Examples of the said solvent include N,N-dimethyl formamide, dimethyl sulfoxide, N,N-dimethyl acetamide, acetone and alcohol. In such solvent is then dissolved in cellulose ester derivative. If the concentration of the cellulose ester derivative is excessively low, the derivative dissipates in the aqueous medium, when the solution thereof is dropped thereinto, to make it difficult to obtain desired microcapsules, though this varies depending on the aqueous medium and cellulose ester derivative used.

Accordingly, the concentration of the cellulose ester derivative is preferably about 5% (W/V) or more, in general. On the other hand, if the concentration of said derivative is too high, there are brought about such disadvantages that the dropping of the solution of said derivative into the aqueous medium becomes difficult and the water permeability of the resulting microcapsules is adversely affected. Accordingly, the upper limit of the concentration of said derivative is about 30% (W/V). In the next place, an adsorbent is dispersed in the solution of the cellulose ester derivative in the hydrophilic solvent. In this case, if the adsorbent contains water, there is such fear that the cellulose ester derivative is deposited. Accordingly, the adsorbent is preferably used as dry as possible or after washing with an organic solvent, which does not have the said derivative deposited and is miscible with the hydrophilic solvent, thereby removing water contained in the adsorbent. The amount of the adsorbent to be used is at least about 20% (W/V), preferably about 40 to 80% (W/W), of the dry weight of the resulting microcapsules. If the solution of the cellulose ester derivative is too viscous to homogeneously disperse the adsorbent, the adsorbent may be dispersed in the hydrophilic solvent before the cellulose ester derivative is dissolved. If necessary, a water-soluble surfactant may also be used in order to modify the properties of the resulting microcapsules and to protect the microcapsules from wetting with water. Subsequently, the cellulose ester derivative solution, in which has been dispersed the adsorbent, is coated by bringing the solution in contact with an aqueous medium. Any aqueous medium may be used as long as it can remove the solvent, in admixture therewith, from the hydrophilic solvent solution containing the cellulose ester derivative and the adsorbent, contains substances capable of being adsorbed on the adsorbent as little as possible, and does not dissolve the cellulose ester derivative. Examples of such aqueous medium are water, aqueous solutions of salts such as sodium chloride and sodium sulfate; aqueous surfactant solutions such as aqueous solutions containing 0.01 to 5% (W/V), preferably 0.25 to 2% (W/V), of anionic surfactants, e.g. alkylbenzene sulfonates such as Newlex R, Newlex C-1 and Newlex Paste H, alkylester sulfonates such as Lapisol B, and sodium sulfates of higher alcohols such as Syntolex; and aqueous hydrophilic protective colloid solutions such as aqueous solutions containing 0.05 to 5% (W/V), preferably 0.5 to 2% (W/V), of sodium carboxymethyl cellulose, hydroxypropyl cellulose, methyl cellulose, hydroxypropylmethyl cellulose or polyvinyl alcohol. The said surfactants may be used in combination with the acid hydrophilic protective colloids. In addition, there may be used ethylene glycol or its aqueous mixture therewith, or propylene glycol or its aqueous mixture therewith. Particularly, the use of such inexpensive aqueous medium as water or an aqueous salt solution is preferred. Furthermore, ethylene glycol or the like is also preferably used in the form of an aqueous mixture therewith. For the improvement in particle shape of the resulting microcapsules, the aqueous medium may be incorporated with 5% (V/V) or less of a hydrophilic solvent such as acetone or methyl alcohol. Subsequently, the dispersion containing aforesaid adsorbent is brought into contact with the above-mentioned aqueous medium. To this effect, the contact may be carried out by dropping the dispersion into the aqueous medium, but diameter of the resulting microcapsules can optionally be controlled by the sizes of droplets formed at the time of dropping. When microfine particles are desired to be obtained, spraying from a nozzle, or the like known procedure may be applied to. The amount of the aqueous medium is such that it can be mixed with the hydrophilic solvent in which the cellulose ester derivative is dissolved, and then the solvent is excluded to deposit the said derivative, and is preferably about 5 to 10 times the amount of the hydrophilic solvent, though it may be used in a larger amount. The thus formed microcapsules coated with the cellulose ester derivative containing adsorbents and having selective adsorbing ability are separated according to a usual solid-liquid separation procedure and then washed to obtain microcapsules to be saponified according to the present invention.

A further example is as follows:

Microcapsules having wall films composed of a cellulose ester derivative, containing adsorbents and having selective adsorbing ability is prepared by dissolving a cellulose ester derivative in a solvent, which is poorly miscible with water, has lower boiling point than that of water and has higher vapor pressure than that of water, dispersing an adsorbent into the thus formed solution, dispersing the resulting dispersion to the form of droplets in a separately prepared aqueous solution containing a surfactant or a protective colloid, and then removing the solvent. In the above-mentioned method, the cellulose derivative, which is a wall material for the adsorbent, is properly selected and first dissolved in a solvent. As this solvent, any solvent may be used so far as it can dissolve the cellulose ester derivative, is poorly miscible, i.e. immiscible or miscible by at most about 15% (V/V), with water, has lower boiling point than that of water and higher vapor pressure than that of water. Examples of such solvent include ethyl ether, isopropyl ether, methylene chloride, ethylene chloride, chloroform, carbon tetrachloride, benzene, cyclohexane, n-hexane, methyl acetate and ethyl acetate; preferably, methylene chloride, ethylene chloride, chloroform, carbon tetrachloride, benzene and ethyl acetate. The above-mentioned solvents may be used either alone or in the form of a mixture of two or more members. In the next place, a cellulose ester derivative is dissolved in said solvent. The concentration of the cellulose ester derivative varies depending on said derivative used and the combination thereof with the solvent. If the concentration is excessively high, the solution is deteriorated in absorbent-dispersing efficiency, while if the concentration is excessively low, the droplets formed by dispersing the solution into an encapsulation liquid medium become unstable or a long time is required for removal of the solvent. Accordingly, the concentration of said derivative is ordinarily about 0.5 to 20% (W/V), and preferably about 2 to 10% (W/V). Subsequently, an adsorbent is dispersed in the cellulose ester derivative solution. The amount of the adsorbent to be used is about 5% (W/W) or more, preferably about 40 to 85% (W/W), of the resulting microcapsules. The thus obtained cellulose ester derivative solution where the adsorbent is dispersed is further dispersed to the form of fine droplets in a vehicle. As the vehicle, there is used an aqueous surfactant or hydrophilic protective colloid solution, which can allow the said adsorbent-dispersed solution to disperse therein to the form of fine droplets, can maintain said droplets stably, and does not deteriorate the adsorption capacity of the adsorbent. Examples of the aqueous surfactant solution are aqueous solutions containing 0.01 to 5% (W/V), preferably 0.25 to 2% (W/V), of anionic surfactants, e.g. alkylbenzene sulfonates such as Newlex R, Newlex C-1 and Newlex Paste H, alkylester sulfonates such as Lapisol B, or sodium sulfates of higher alcohols such as Syntolex; and examples of the aqueous protective colloid solution are aqueous solutions containing 0.05 to 5% (W/V), preferably 1 to 2% (W/V), of sodium carboxymethyl cellulose, hydroxypropyl cellulose, methyl cellulose, hydroxypropylmethyl cellulose or polyvinyl alcohol. These surfactants and hydrophilic protective colloids may be used in combination.

Into the above-mentioned vehicle is then dispersed the cellulose ester derivative solution where the absorbent is dispersed. The amount of the vehicle to be used is at least 2 times, preferably about 3 to 7 times, the amount of the solution where the adsorbent is dispersed. In this case, the solution where adsorbent is dispersed should be dispersed in the form of fine droplets. The conditions adopted at the time of the dispersion, such as stirring speed and the like, may suitably be changed according to the cellulose ester derivative used, the concentration of the cellulose ester derivative in the dispersed droplets, an amount of the adsorbent, an amount of the vehicle, and particle size of the desired microcapsules. Subsequently, the dispersion containing the fine droplets is freed from the solvent by allowing it to stand with stirring at room temperature, or by heating under reduced pressure, whereby particles of the adsorbent enveloped with the cellulose ester derivative are deposited to form microcapsules. The thus formed microcapsules are recovered and washed to obtain microcapsules coated with the cellulose ester derivative, containing adsorbent and having selective adsorbing ability.

A still further example is as follows:

Microcapsules having wall films composed of a cellulose ester derivative, containing adsorbent and having selective adsorbing ability is prepared by dissolving a cellulose ester derivative in an organic solvent, which is poorly miscible with the vehicle mentioned later, is miscible with water, and has lower boiling point than that of water, adding to the thus formed solution such an amount of water that the cellulose ester derivative is not deposited, dispersing an adsorbent into the said solution, dispersing the resulting dispersion into a liquid paraffin or silicone oil used as a vehicle, and then removing the said organic solvent. In this method, the cellulose ester derivative, which is a wall material for the adsorbent, is properly selected and dissolved in an organic solvent. As the organic solvent, any organic solvent may be used so far as it is poorly miscible with the vehicle such as liquid paraffin or silicone oil, is miscible with water, and has lower boiling point than that of water. Examples of such organic solvent include acetone, methyl ethyl ketone, methanol, ethanol and propanol. Particularly preferable organic solvent is acetone or methanol which easily dissolves the cellulose ester derivative even when it is in a hydrated state, and is lower in boiling point than water.

The amount of water contained in the organic solvent may be such an amount as not to deposit the cellulose ester derivative, preferably the maximum amount to that effect. Although the amount depends on the combination of the organic solvent and cellulose ester derivative employed and on the concentration of the said derivative. For example, if the concentration of the cellulose ester derivative is 5 to 10% (W/V), which is a preferable concentration of said ester, and if the water content of the organic solvent is less than about 2% (V/V), the resulting microcapsules merely show somewhat excellent effect as compared with those obtained by a conventional method. On the other hand, if the water content of the organic solvent is more than about 20% (V/V), the cellulose ester derivative is brought to such a state as to be easily deposited or is undesirably deposited. Accordingly, when concentration of the cellulose ester derivative in a solution thereof is about 5 to 10% (W/V), it is preferable to use acetone containing about 2 to 20% (V/V), particularly 7 to 15% (V/V), of water, or to use methanol containing about 3 to 10% (V/V) of water. The amount of water contained in the organic solvent may be controlled in such a manner that in case the water content is lower, the amount of water added is made larger, while in case the water content is higher, the amount of water added is made smaller. In the said organic solvent is then dissolved a cellulose ester derivative. If the concentration of the cellulose ester derivative in the solution is made excessively low, stable droplets are formed with difficulty when the solution is dispersed into a vehicle, and the organic solvent is undesirably required to be used in a large amount. On the other hand, if the concentration of said derivative is made excessively high, the solution becomes too high in viscosity to make dispersion of the adsorbent. Accordingly, it is preferable to use the said derivative at a concentration of about 5 to 10% (W/V). To the cellulose ester derivative solution is then added water in such a proper amount as not to precipitate the cellulose ester derivative, as mentioned previously. In the case of the present invention, the said derivative may be dissolved in an organic solvent, which has previously been brought to a hydrous state, and then into the resulting solution is dispersed an adsorbent used as a core substance. The adsorbent is preferably used in an amount of about 80 to 50% (W/W) based on the amount of the resulting microcapsules. If the amount of the adsorbent is excessively small, the resulting microcapsules become extremely low is adsorption capacity per unit weight, while if the amount thereof is excessively large, the resulting microcapsules become brittle. The thus obtained hydrous organic solvent solution containing the adsorbent and the cellulose ester derivative is then dispersed and emulsified in a vehicle. Examples of the vehicle include liquid paraffins such as fluid paraffin, Japanese pharmacopeia paraffin and halogenated paraffin, and silicone oils such as methyl silicone oil, phenyl silicone oil and methylphenyl silicone oil, which are high in viscosity and are inert. The aforesaid organic solvent solution is added to this vehicle with stirring, and thus is dispersed and emulsified therein. The amount of the vehicle is preferably about 4 to 15 times the amount of the organic solvent solution. If the amount of the vehicle is excessively small, emulsified droplets of the organic solvent solution adhere to one another to form lumps, while if the amount thereof is excessively large, the recovery of the resulting microcapsules become complex. Subsequently, the dispersion is freed from the organic solvent according to a known procedure by stirring or by heating with stirring to form microcapsules containing adsorbent and having selective adsorbing ability. The thus formed microcapsules may be separated and washed according to usual procedures.

The microcapsules prepared according to the methods as mentioned above are subjected to ester hydrolysis to convert cellulose derivatives into cellulose. The ester hydrolysis should be conducted without disintegrating nor dissolving the microcapsules. That is, the ester hydrolysis is carried out in a manner such that the microcapsules are dispersed in an aqueous acid or alkali solution, which has been properly controlled in concentration so as to be sufficient and necessary for the removal of ester residues of the cellulose ester derivative used in the microcapsules, and so as not to disintegrate nor dissolve the microcapsules. Examples of the acid used in said ester hydrolysis include sulfuric, hydrochloric and phosphoric acids, while examples of the alkali include sodium hydroxide, potassium hydroxide, ammonia and triethylamine. The ester hydrolysis is carried out at a temperature which is usually from 50° to 80° C., preferably 60° to 70° C. for a time which is usually from 30 to 120 minutes, preferably from 30 to 60 minutes. When an aqueous acid solution is used, its concentration is preferably from 0.5 to 5 N; when an aqueous alkali solution is used, its concentration is from 0.2 to 2 N. If necessary, a catalyst may also be used.

The degree of ester hydrolysis is usually 95% or more, preferably 98% or more.

The cellulose microcapsules of the present invention have an outer diameter from about 100 to 5000 microns and have an outer barrier layer of continuous solid phase cellulose which is 0.5 to 5 microns in thickness and contains micropores of from about 10 to 80 angstroms in diameter, adsorbent powders being dispersed within cellulose gel matrix innerside of said outer barrier layer. The microcapsules of the present invention have a void volume equal to at least 25% of the total volume thereof. They are not deactivated in adsorption capacity and molecular sieving effect by de-esterification and far more excellent in acid resistance, alkali resistance and solvent resistance than those before de-esterification. Accordingly, they can stably display their various abilities over long periods of time even in acidic solutions, alkali solutions and organic solvent solutions, and thus can be put into various uses such as, for example, extraction and purification of antibiotics from fermentation liquids, extraction and purification of nucleic acids from the cells of microorganisms, extraction of natural dyes, recovery of valuable substances from waste liquors, decolorization, and treatment of waste liquors by removal of organic compounds.

The present invention is illustrated in detail below with reference to examples but the invention is not limited to the examples.

EXAMPLE 1

In a solution of 100 g. of cellulose diacetate (produced by Asahi Chemical Co.) in 1.2 liters of N,N-dimethyl formamide (DMF) was homogeneously dispersed 100 g. of an activated charcoal (trade name: Carborafin, produced by Takeda Chemical Industries, Ltd.). The resulting dispersion was dropped to the form of droplets into water by use of an atomizer cup (diameter 50 mm) to obtain microcapsules encapsulated with cellulose diacetate, containing activated charcoal (size of microcapsules: 0.2 to 1.5 mm. in diameter).

800 Grams of the thus prepared microcapsules containing activated charcoal were sufficiently washed with deionized water, charged into 6,200 ml. of a 0.25 N aqueous sodium hydroxide solution and then stirred at 70° ± 2° C. for 1 hour to saponify the wall films of the microcapsules. Subsequently, the microcapsules were sufficiently washed with water until the pH of the wash water become 7.0 or less to obtain cellulose microcapsules containing activated charcoal. The acetylation degree of the cellulose of the microcapsules before saponification was 54.1%, but less than 0.4% after saponification.

EXAMPLE 2

In a solution of 200 g. of cellulose diacetate in 2.7 liters of DMF was homogeneously dispersed 400 g. of Carborafin. The resulting dispersion was added in the form of droplets into water by use of an atomizer cup to obtain microcapsules encapsulated with cellulose diacetate containing activated charcoal.

630 Grams of the thus prepared microcapsules containing activated charcoal were sufficiently washed with deionized water, charged into 6,200 ml. of a 0.25 N aqueous sodium hydroxide solution and saponified with stirring at 70° ± 2° C. for 1 hour. Subsequently, the microcapsules were sufficiently washed with water to obtain cellulose microcapsules containing activated charcoal. The acetylation degree of the cellulose of the microcapsules before saponification was 54.1%, but less than 0.4% after saponification.

EXAMPLE 3

In a solution of 100 g. of cellulose diacetate (acetylation degree 54.1%) in 1.5 liters of DMF was homogeneously dispersed 300 g. of Carborafin. The resulting dispersion was added in the form of droplets into water by use of an atomizer cup to obtain microcapsules encapsulated with hydrogels of cellulose diacetate containing activated charcoal. 560 Grams of the microcapsules were sufficiently washed with deionized water, charged into 6,200 ml. of a 0.25 N aqueous sodium hydroxide solution and saponified with stirring at 70° ± 2° C. for 1 hour. Subsequently, the microcapsules were sufficiently washed with water until the pH of the wash water became neutral to obtain cellulose microcapsules containing activated charcoal (acetylation degree of the cellulose:less than 0.4%).

EXAMPLE 4

In a solution of 10 g. of cellulose triacetate (acetylation degree 61.2%) in 100 ml. of DMF was dispersed 20 g. of bentonite. The resulting dispersion was added in the form of droplets into water by use of an atomizer cup to obtain microcapsules containing bentonite. 100 Grams of the microcapsules containing bentonite were saponified at 50° C. for 30 minutes in 250 ml. of a 0.5 N aqueous sodium hydroxide solution with stirring, and then sufficiently washed with water until the pH of the wash water became 8 or less to obtain cellulose microcapsules containing bentonite (acetylation degree of the cellulose: less than 0.6%).

EXAMPLE 5

In a solution of 40 g. of cellulose diacetate (acetylation degree: 54.5%) in a mixed solvent comprising 1 liter of methylene chloride and 400 ml. of acetone was dispersed 40 g. of Carborafin. The resulting dispersion was added with stirring at room temperature to 6 liters of an aqueous solution containing 30 g. of sodium laurylbenzene sulfonate dissolved therein, and the stirring was further continued, whereby the solvent was evaporated to form a precipitate. The precipitate was recovered by filtration, washed with water and then dried to obtain microcapsules encapsulated with cellulose diacetate of 0.25 to 1.5 mm. in particle size containing activated charcoal. 70 Grams of the thus obtained microcapsules were sufficiently wetted with 400 ml. of deionized water, charged into 2,100 ml. of a 0.25 N aqueous sodium hydroxide solution kept at 75° C. and saponified with stirring at 70° C. for 1 hour. Subsequently, the microcapsules were sufficiently washed with water until the pH of the wash water became 8.0 or less to obtain cellulose microcapsules containing activated charcoal (acetylation degree of the cellulose: less than 0.4%).

EXAMPLE 6

In a solution of 40 g. of cellulose diacetate (acetylation degree: 54.5%) in a mixed solvent comprising 1.1 liters of methylene chloride and 450 ml. of acetone was dispersed 60 g. of Carborafin. The resulting dispersion was added with stirring at room temperature to 6 liters of an aqueous solution containing 30 g. of sodium laurylbenzene sulfonate dissolved therein, and the stirring was further continued, whereby the solvent was evaporated to form a rigid microcapsule. This was recovered by filtration, washed with water and then dried to obtain 97 g. of microcapsules encapsulated with cellulose diacetate of 0.25 to 1.5 mm. in particle size containing activated charcoal. 70 Grams of the thus obtained microcapsules were sufficiently wetted with 400 ml. of deionized water, charged into 3,100 ml. of a 0.25 N aqueous sodium hydroxide solution kept at 75° C. and saponified with stirring at 70° C. for 1 hour. Subsequently, the microcapsules were sufficiently washed with water to obtain cellulose microcapsules containing activated charcoal (acetylation degree of the cellulose: less than 0.4%) which had not been changed in shape from the microcapsules before saponification.

EXAMPLE 7

In a solution of 5 g. of cellulose diacetate in 60 ml. of dimethyl sulfoxide (DMSO) was homogeneously dispersed 10 g. of activated charcoal powders (trade name Kyoryoku Shirasagi, produced by Takeda Chemical Industries, Ltd.). The resulting dispersion was dispersed to the form of fine droplets into 300 ml. of liquid paraffin of Japanese Pharmacopoeia (19 cps. at 25° C.) under propeller stirring, and the stirring was further continued for several minutes to make the dispersed state of the system stable. Subsequently, 100 ml. of a mixture of water and acetone (4:1) was added as a non-solvent at a rate of 5 ml. per minute to the above liquid paraffin solution in the dispersed state to form microcapsules encapsulated with cellulose diacetate of 500 to 1,000 $\mu$ in particle size containing activated charcoal. The thus formed microcapsules were recovered by filtration using a filter cloth, sufficiently washed with n-hexane and then dried. 10 Grams of the microcapsules were sufficiently wetted with 100 ml. of boiling water for 30 minutes, thereafter allowed to drain, charged into 500 ml. of a 0.25 N aqueous sodium hydroxide solution kept at 75° C. and saponified with stirring at 70° ± 2° C. Subsequently, the microcapsules were washed with water and dried to obtain cellulose microcapsules containing activated charcoal which had not been changed in shape from the microcapsules before saponification.

EXAMPLE 8

In a solution of 10 g. of cellulose triacetate (acetylation degree: 61.2%) in 130 ml. of DMSO was homogeneously dispersed 30 g. of bentonite. The resulting dispersion was dispersed to the form of fine droplets into 600 ml. of liquid paraffin of Japanese Pharmacopoeia (19 cps. at 25° C.) under propeller stirring, and the stirring was further continued for several minutes to make the dispersed state of the system stable. Subsequently, 200 ml. of a mixture of water and acetone (6:1) was added as a non-solvent at a rate of 5 ml. per minute to the above dispersion to form microcapsules of 500 to 1,000 $\mu$ particle size. The thus formed microcapsules were recovered by filtration using a filter cloth, sufficiently washed with n-hexane, then with petroleum ether and then dried. 10 Grams of the above microcapsules were sufficiently wetted with 100 ml. of boiling water for 30 minutes, thereafter allowed to drain, charged into 500 ml. of a 0.25 N aqueous sodium hydroxide solution kept at 75° C. and saponified with stirring at 70° ± 2° C. Subsequently, the microcapsules were washed with water and dried to obtain cellulose microcapsules containing activated charcoal which had not been changed in shape from the microcapsules before saponification.

EXAMPLE 9

In a solution in 120 ml. of DMF of 10 g. of cellulose acetate butyrate (containing 30.0% of acetyl group and 17.5% of butyl group, produced by Eastman Kodak Co.) was dispersed 20 g. of Carborafin. The resulting dispersion was added in the form of droplets into water to obtain microcapsules encapsulated with cellulose acetate butyrate containing activated charcoal. 100 Grams of the microcapsules were immersed in 1,000 ml. of water at 70° C. for 20 minutes, further charged into 1,000 ml. of a 0.25 N aqueous sodium hydroxide solution, and saponified at 70° ± 2° C. for 1 hour. Thereafter, the microcapsules were sufficiently washed with water to obtain cellulose microcapsules containing activated charcoal (acetyl and butyl group contents of the cellulose: less than 0.4 and less than 0.3%, respectively). The microcapsules were not changed in shape after saponification.

EXAMPLE 10

In a solution in 100 ml. of DMF of 10 g. of cellulose acetate propionate (containing 30.0% of acetyl group and 17.5% of propyl group) was dispersed 20 g. of Carborafin. The resulting dispersion was added in the form of droplets into water to obtain microcapsules encapsulated with cellulose acetate propionate containing activated charcoal. Subsequently, the microcapsules were saponified in the same manner as in Example 9 to obtain cellulose microcapsules containing activated charcoal (acetyl and propyl group contents of the cellulose: less than 0.4% and less than 0.3%, respectively), without change in shape of the microcapsules.

EXAMPLE 11

In a solution of 10 g. of cellulose diacetate (acetylation degree 54.1%) in 100 ml. of DMF was dispersed 10 g. of an ion exchange resin Amberlite CG-50. The resulting dispersion was added in the form of droplets into water to obtain microcapsules encapsulated with cellulose diacetate containing Amberlite CG-50 resins. Subsequently, 80 g. of the above microcapsules were sufficiently washed with deionized water, charged into 800 ml. of a 0.25 N aqueous sodium hydroxide solution and saponified with stirring at 70° ± 2° C. Thereafter, the microcapsules were sufficiently washed with water to obtain cellulose microcapsules containing ion-exchange resins (acetylation degree of the cellulose: less than 0.5%).

EXAMPLE 12

In a solution of 10 g. of cellulose triacetate in 200 ml. of methylene chloride was dispersed 40 g. of bentonite powders. The resulting dispersion was dispersed with propeller stirring to the form of fine droplets into 800 ml. of an aqueous solution containing 4 g. of sodium laurylbenzene sulfonate dissolved therein, and the stirring was further continued at room temperature, whereby the methylene chloride was evaporated to form a rigid microcapsule. This was recovered by filtration, washed with water and then dried to obtain microcapsules encapsulated with cellulose triacetate containing bentonite powders. Subsequently, 50 g. of the microcapsules were swelled for 30 minutes in a mixture of ethanol and water (1:1), charged into 300 ml. of a 2% aqueous sodium hydroxide solution and saponified with stirring at 50° C. for 30 minutes. Thereafter, the microcapsules were sufficiently washed with water and then dried to obtain cellulose microcapsules.

EXAMPLE 13

In a solution of 150 g. of cellulose diacetate in 3.5 l of acetone containing 13% of water was dispersed 225 g. of Kyoryoku Shirasagi. The resulting dispersion was poured with stirring into 9 l of liquid paraffin of Japanese Pharmacopoeia containing 0.5% of Ranex (trade name: CRODA NIPPON CO.) and dispersed to the form of droplets of 600 to 1,500 $\mu$ in size. The stirring was further continued for 4 hours, whereby the acetone was evaporated to rigid microcapsules encapsulated with cellulose diacetate of 600 to 1,500 $\mu$ in particle size containing activated charcoal. Subsequently, the microcapsules were washed several times with n-hexane and then dried to obtain 380 g. of said microcapsules. 100 Grams of the above microcapsules were sufficiently swelled for 30 minutes with 1,000 ml. of boiling water, charged into 5,000 ml. of a 0.25 N aqueous sodium hydroxide solution and saponified with stirring at 70° ± 2° C. Thereafter, the microcapsules were washed with water and then dried to obtain cellulose microcapsules containing activated charcoal.

EXAMPLE 14

In a solution of 150 g. of cellulose diacetate in 3,500 ml. of acetone containing 13% of water was dispersed 225 g. of an ion exchange resin Amberlite CG-50. The resulting dispersion was poured with stirring into 9 l of liquid paraffin of Japanese Pharmacopoeia containing 0.5% of Ranex, and dispersed to the form of droplets of 600 to 1,500 $\mu$ in size. The stirring was further continued for 4 hours, whereby the acetone was evaporated to rigid microcapsules encapsulated with cellulose diacetate of 600 to 1,500 $\mu$ in particle size containing Amberlite CG-50 resins. Subsequently, the microcapsules were washed several times with n-hexane and then dried to obtain 380 g. of said microcapsules. 100 Grams of the above microcapsules were sufficiently swelled for 30 minutes with 1,000 ml. of boiling water, charged into 5,000 ml. of a 0.25 N aqueous sodium hydroxide solution kept at 75° C. and saponified with stirring at 70° ± 2° C. Thereafter, the microcapsules were washed with water and then dried to obtain cellulose microcapsules containing Amberlite CG-50 resins.

EXAMPLE 15

In a solution of 10 g. of cellulose triacetate in 100 ml. of DMSO was dispersed 10 g. of Kyoryoku Shirasagi. The resulting dispersion was added in the form of droplets into water to obtain 110 g. of microcapsules encapsulated with cellulose triacetate containing activated charcoal. Subsequently, 70 g. of the microcapsules were sufficiently washed with deionized water, charged into 1,500 ml. of a 0.5% sulfuric acid solution kept at 50° C. and hydrolyzed at 50° C. for 1 hour. Thereafter, the microcapsules were sufficiently washed with water to obtain cellulose microcapsules containing activated charcoal (acetylation degree: 0.7%).

EXAMPLE 16

The cellulose microcapsules containing adsorbent powders which were obtained in Examples 1, 2, 3, 5 and 6 (hereinafter, the said microcapsules will be referred to as test samples 1, 2, 3, 4 and 5, respectively) were examined in adsorption capacity. As controls, there were used activated charcoal powders (trade name Carborafin, produced by Takeda Chemical Industries, Ltd.; Control sample 1), commercially available granular carbons Adoster-B 1-L (produced by Ados Chemical Co.; Control sample 2) and Adoster-P 5-L (produced by Ados Chemical Co.; Control sample 3), and the cellulose ester derivative microcapsules containing adsorbent powders which were used as starting materials, in Examples 1, 2, 3, 5 and 6 (hereinafter, the said microcapsules will be referred to as control samples 4, 5, 6, 7 and 8, respectively). The amount of adsorbent powders used was 1 g. in each case. The measurement of adsorption capacity was carried out in such a manner that each of the above-mentioned samples was added to 100 ml. of a 0.01% aqueous Methylene Blue solution ($OD_{595\ m\mu}$ + 5.0), the resulting mixture was stirred, allowed to stand for 24 hours and then filtered, and the filtrate was measured in $OD_{595\ m\mu}$ value to evaluate the adsorption capacity of each sample for Methylene Blue. The results obtained are set forth in Table 1.

Table 1

| Sample | | $OD_{595\ m\mu}$ value | Adsorption degree |
|---|---|---|---|
| Test sample | 1 | 0.23 | 95.4 |
| " | 2 | 0.21 | 95.8 |
| " | 3 | 0.14 | 97.2 |
| " | 4 | 0.32 | 93.6 |
| " | 5 | 0.35 | 93.1 |
| Control sample | 1 | 0 | 100 |
| " | 2 | 1.18 | 76.4 |
| " | 3 | 2.08 | 58.4 |
| " | 4 | 0.22 | 95.7 |
| " | 5 | 0.23 | 95.5 |
| " | 6 | 0.16 | 96.8 |
| " | 7 | 0.38 | 92.5 |
| " | 8 | 0.36 | 92.8 |

$$\text{Adsorption degree} = \frac{\text{OD value of original liquid} - \text{OD value of filtrate}}{\text{OD value of original liquid}} \times 100\ (\%)$$

As shown in Table 1, the adsorption capacities of the cellulose microcapsules containing adsorbent powders which were obtained in Examples 1, 2, 3, 5 and 6 of the present invention were scarcely lower than the adsorption capacity of the conventional activated charcoal powders (control sample 1), were superior to those of the commercially available granular carbons (control samples 2 and 3), and were equal to those of the microcapsules before saponification (control samples 4, 5, 6, 7 and 8).

EXAMPLE 17

The test samples 1, 2 and 3 and control samples 1, 2, 3, 4, 5 and 6 as described in Example 16 were measured in adsorption capacity for a caramel dye. The measurement was carried out in such a manner that each of the above-mentioned samples (containing 1 g. of adsorbent) was added to 100 ml. of an aqueous caramel solution ($OD_{420\ m\mu}$ = 2.0), the resulting mixture was stirred, allowed to stand for 24 hours and then filtered, and the filtrate was measured in $OD_{420\ m\mu}$ value to evaluate the adsorption capacity of each sample for caramel dye. The results obtained are set forth in Table 2.

Table 2

| Sample | | $OD_{420\ m\mu}$ value | Relative adsorption degree |
|---|---|---|---|
| Test sample | 1 | 0.56 | 100 |
| " | 2 | 0.64 | 94.5 |
| " | 3 | 0.62 | 95.8 |
| Control sample | 1 | 0.56 | 100 |
| " | 2 | 0.82 | 82.0 |
| " | 3 | 1.46 | 37.5 |
| " | 4 | 0.64 | 94.5 |
| " | 5 | 0.70 | 90.3 |
| " | 6 | 0.64 | 94.5 |

As shown in Table 2, the adsorption capacities of cellulose microcapsules containing adsorbent powders which were obtained in Examples 1, 2 and 3 of the present invention were superior to those of the commercially available granular carbons (control samples 2 and 3), and were substantially identical with and not inferior to those of the activated charcoal powders (control sample 1) and the microcapsules before saponification (control samples 4, 5 and 6.).

EXAMPLE 18

The same test samples 1, 2, 3, 4 and 5 as described in Example 16 were measured in molecular sieving effect. Molecular sieve samples used in the measurement were the organic compounds shown below which can be adsorbed by 100% on uncoated adsorbents.

| Molecular sieve samples | Molecular weight |
|---|---|
| A: Methylene Blue | 374 |
| B: Tuberactinomycin | 798 |
| C: Insulin | 5,700 |
| D: Egg white lysozyme | 14,000 |
| E: α-Chymotrypsin | 24,500 |
| F: Semialkali protease | 30,000 |
| G: Egg white albumin | 45,000 |
| H: Serum albumin | 67,000 |

The measurement was carried out in the following manner:

Each of the test samples 1, 2, 3, 4 and 5 (containing 1 g. of adsorbent) was packed in a column of 1 cm. in diameter. Through this column was passed 10 ml. of each of the above-mentioned molecular sieve samples (A to H) at a rate of 0.5 ml./min. and then the column was sufficiently washed with water. Subsequently, the effluent and the wash liquid were combined together, and a part of the resulting liquid was taken out and measured in $OD_{280 m\mu}$ (in $OD_{595 m\mu}$ only in the case of the molecular sieve sample A). The thus measured OD value was multiplied by the amount of the liquid, and then compared with the OD value of the untreated molecular sieve sample to calculate the adsorption degree, from which the molecular sieving effect of each test sample was measured.

The results obtained were as set forth in Table 3.

Table 3

| Molecular sieve sample (concentration = mg/ml.) | Test sample 1 | 2 | 3 | 4 | 5 |
|---|---|---|---|---|---|
| A ( 5 mg/ml.) | 100 | 100 | 100 | 100 | 100 |
| B (10 ") | 100 | 100 | 100 | 100 | 100 |
| C (10 ") | 100 | 100 | 100 | 100 | 100 |
| D (10 ") | 98 | 99 | 99 | 98.8 | 97.8 |
| E (10 ") | 96.1 | 98 | 97 | 98.6 | 90.4 |
| F (10 ") | 90.0 | 97.6 | 98.3 | 96.4 | 79.1 |
| G (10 ") | 30.6 | 65.3 | 93.7 | 24.2 | 8.4 |
| H (10 ") | 0 | 0 | 0 | 0 | 0 |

As clearly shown in Table 3, it is recognized that the cellulose microcapsules containing adsorbent powders which were obtained in Examples 1, 2, 3, 5 and 6 of the present invention have molecular sieving effects.

EXAMPLE 19

The same test samples 1, 2, 3, 4 and 5 and control samples 4, 5, 6, 7 and 8 as described in Example 16 were tested in acid resistance, alkali resistance, alcohol resistance and acetone resistance. The acid resistance, alkali resistance, alcohol resistance and acetone resistance tests were carried out by immersing each sample for 1, 5, 10, 15 and 25 days in each of a 1 N aqueous hydrochloric acid solution, a 1 N aqueous sodium hydroxide solution, a 100% methanol solution and a 100% acetone solution, and then observing the state of each solution and the shape of the sample. The results obtained are set forth in Table 4.

As is clear from Table 4, the cellulose microcapsules containing adsorbent powders which are obtained by the present invention are far more excellent in acid resistance, alkali resistance, alcohol resistance and acetone resistance than these which have not been subjected to saponification.

Further, the void volumes of the microcapsules in the above Examples were measured to give the following results:

| Example No. | void volume % |
|---|---|
| 1 | 92.1 |
| 2 | 84.1 |
| 3 | 82.4 |
| 4 | 78.0 |
| 5 | 83.4 |
| 6 | 81.1 |
| 7 | 83.4 |
| 8 | 85.3 |
| 9 | 79.5 |
| 10 | 80.8 |
| 11 | 82.4 |
| 12 | 80.0 |
| 13 | 75.0 |
| 14 | 72.0 |
| 15 | 83.3 |

In the above Examples, the ratios of the mixed solvents used are indicated by volume.

Table 4

| | Acid resistance (days) | | | | | Alkali resistance (days) | | | | | Alcohol resistance (days) | | | | | Acetone resistance (days) | | | | |
|---|---|---|---|---|---|---|---|---|---|---|---|---|---|---|---|---|---|---|---|---|
| | 1 | 5 | 10 | 15 | 25 | 1 | 5 | 10 | 15 | 25 | 1 | 5 | 10 | 15 | 25 | 1 | 5 | 10 | 15 | 25 |
| Test sample 1 | − | − | − | − | − | − | − | − | − | − | − | − | − | − | − | − | − | − | − | − |
| Test sample 2 | − | − | − | − | − | − | − | − | − | − | − | − | − | − | − | − | − | − | − | − |
| Test sample 3 | − | − | − | − | − | − | − | − | − | − | − | − | − | − | − | − | − | − | − | − |
| Test sample 4 | − | − | − | − | − | − | − | − | − | − | − | − | − | − | − | − | − | − | − | − |
| Test sample 5 | − | − | − | − | − | − | − | − | − | − | − | − | − | − | − | − | − | − | − | − |
| Control sample 4 | − | − | − | − | ± | ++ | ++ | ++ | ++ | ++ | ++ | ++ | ++ | + | ++ | ++ | ++ | ++ | ++ | ++ |
| Control sample 5 | − | − | − | − | ± | ++ | ++ | ++ | ++ | ++ | ++ | ++ | ++ | + | ++ | ++ | ++ | ++ | ++ | ++ |
| Control sample 6 | − | − | − | − | ± | ++ | ++ | ++ | ++ | ++ | ++ | ++ | ++ | + | ++ | ++ | ++ | ++ | ++ | ++ |
| Control sample 7 | − | − | − | − | ± | ++ | ++ | ++ | ++ | ++ | ++ | ++ | ++ | + | ++ | ++ | ++ | ++ | ++ | ++ |
| Control sample 8 | − | − | − | − | ± | ++ | ++ | ++ | ++ | ++ | ++ | ++ | ++ | + | ++ | ++ | ++ | ++ | ++ | ++ |

Note:
−: Entirely unchanged.
±: The solution became somewhat turbid, though the shape was left unchanged.
+: The shape somewhat disintegrated.
++: The shape completely disintegrated.

What we claim is:
1. An adsorbing cellulose microcapsule having selective adsorbing capacity and an outer diameter from 100 to 5000 microns, consisting of an outer semipermeable barrier layer of cellulose from about 0.5 to 5 microns in thickness having micropores from 10 to 80 angstroms in diameter and adsorbent powders which are dispersed within cellulose gel matrix innerside of said barrier layer and having a void volume equal to at least 25% of the total volume thereof.

2. A process for producing an adsorbing cellulose microcapsule as claimed in claim 1, which comprises hydrolyzing ester groups of a cellulose ester derivative microcapsule, consisting of an outer barrier layer of cellulose ester derivative having micropores and adsorbent powders which are dispersed within cellulose ester derivative gel matrix innerside of said barrier layer.

3. A process as claimed in claim 2, wherein hydrolysis is carried out by using an aqueous alkali solution with a concentration in the range from 0.2 N to 2 N.

4. A process as claimed in claim 2, wherein hydrolysis is carried out by using an aqueous acid solution with a concentration in the range from 0.5 N to 5 N.

5. A process as claimed in claim 3, wherein hydrolysis is carried out at a temperature in the range from 50° to 80° C. for a time from 30 to 120 minutes.

6. A process as claimed in claim 5, wherein hydrolysis is carried out at a temperature in the range from 60° to 70° C. for a time from 30 to 60 minutes.

7. The adsorbing cellulose microcapsule as claimed in claim 1, wherein said adsorbing cellulose microcapsule has an adsorption capacity in excess of 93.1% as determined by a comparative optical density technique.

8. The adsorbing cellulose microcapsule as claimed in claim 1, wherein said adsorbent powders are selected from the group consisting of activated charcoal, bone black, silica gel, silica alumina gel, zeolite, bentonite, ion exchange resins and metal chelate resins.

9. A process as claimed in claim 2, wherein the degree of ester hydrolysis is in excess of about 95%.

10. A process as claimed in claim 2, wherein said ester groups of a cellulose ester derivative microcapsule are selected from the group consisting of fatty acid esters, mixed fatty acid esters, inorganic acid esters and aromatic acid esters.

11. A process as claimed in claim 10, wherein said fatty acid esters are selected from the group consisting of the monoacetate, diacetate, triacetate, propionate and butyrate esters of cellulose.

12. A process as claimed in claim 10, wherein said inorganic acid esters of cellulose are selected from the group consisting of nitrate, sulfate and phosphate esters of cellulose.

13. A process as claimed in claim 10, wherein said aromatic acid esters of cellulose consist of cellulose benzoate.

14. A process as claimed in claim 2, wherein said cellulose ester derivative is a cellulose ester and the cellulose ester is selected from the group consisting of cellulose monoacetate, cellulose diacetate, cellulose triacetate, cellulose propionate, cellulose butyrate, cellulose acetate propionate, cellulose acetate butyrate, cellulose nitrate, cellulose sulfate, cellulose phosphate and cellulose benzoate.

15. A process as claimed in claim 3, wherein said aqueous alkali solution is comprised of an alkali selected from the group consisting of sodium hydroxide, potassium hydroxide, ammonia and triethylamine.

16. A process as claimed in claim 4, wherein said aqueous acid solution is comprised of an acid selected from the group consisting of sulfuric, hydrochloric and phosphoric.

17. A process for producing an adsorbing cellulose microcapsule having selective adsorbing capacity which has an outer diameter of from 100 to 5000 microns, which has an outer semipermeable barrier layer of cellulose having micropores from 10 to 80 angstroms in diameter and which is resistant to acid, bases and organic solvents comprising subjecting a cellulose ester precursor microcapsule having a cellulose ester derivative as an outer wall film and containing adsorbent powders that are dispersed within a gel matrix of the cellulose ester derivative and are enclosed within said film to ester hydrolysis at a temperature between about 50° and 80° C. for a period ranging between about 30 to 120 minutes.

18. The process as claimed in claim 17, wherein said ester hydrolysis is carried out using an aqueous alkali solution having a concentration ranging between about 0.2 to 2 N.

19. A process as claimed in claim 17, wherein said ester hydrolysis is carried out using an aqueous acid solution with a concentration ranging from about 0.5 to 5 N.

20. A process as claimed in claim 17, wherein said ester hydrolysis is carried out employing an aqueous acid or alkali solution and the concentration thereof is controlled to be sufficient for the removal of ester residues of the cellulose ester without disintegrating or dissolving the microcapsules prepared.

* * * * *